United States Patent Office 3,409,668
Patented Nov. 5, 1968

3,409,668
SUBSTITUTED ANTHRANILAMIDES AND PROCESS FOR THE PREPARATION THEREOF
Giuseppe Palazzo and Bruno Silvestrini, both of Via Amelia 70, Rome, Italy
No Drawing. Filed May 17, 1965, Ser. No. 456,566
Claims priority, application Italy, Nov. 7, 1964, 23,891/64
19 Claims. (Cl. 260—558)

ABSTRACT OF THE DISCLOSURE

Anthranilamides and salts thereof having therapeutic properties are provided, together with a process for their preparation.

This invention relates to a series of substituted anthranilamides having the general Formula I, and a process for the preparation thereof:

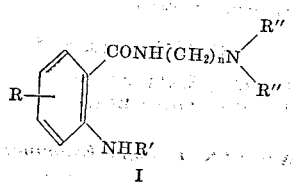

wherein
R=H, Cl
R'=lower alkyl having from 1 to 4 carbon atoms,
$C_6H_5CH_2$, $p.ClC_6H_4CH_2$, $p.CH_3OC_6H_4CH_2$
$C_6H_5$, $ClC_6H_4$
R''=$CH_3$, $C_2H_5$
n=2, 3

The invention also relates to physiologically tolerable salts of the anthranilamides of the general Formula I, such as hydrochloride, phosphate, citrate, maleate, mandelate and benzilate. The anthranilamides of the general Formula I and their salts have remarkable analgesic, anti-inflammation and anti-ulcer action.

According to the invention process, the substituted anthranilamides of the general Formula I can be prepared by reacting suitable dialkylaminoalkylamines having the general Formula II

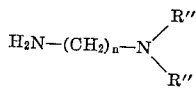

wherein R'' and n have the meaning as specified above, with isatoic anhydrides having the general Formula III, according to the following scheme:

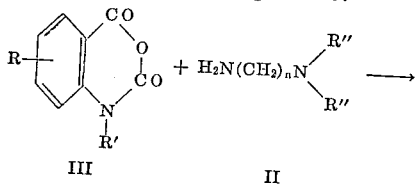

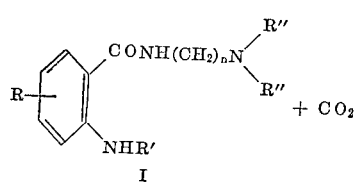

wherein R, R', R'' and n have the meaning as specified above.

The isatoic anhydrides (III) useful in the process of the invention are partially described in literature, and can be obtained in any case by following per se known procedures. The reaction between said isatoic anhydrides and the amines of the general Formula II can be suitably carried out in the presence of solvents, the use of water having been proved as being particularly advantageous. According to a preferred embodiment of the invention process, a rather concentrated aqueous solution of dialkylaminoalkylamine can be prepared and heated to a temperature preferably in the range from about 60 to 110° C. To said solution a stoichiometric quantity (lower or higher quantities may also be used but they do not present any advantages) of an isatoic anhydride can be added in portions. After said addition is completed, the reaction mixture can be heated until carbon dioxide no longer evolves in order to complete the reaction.

The cooled reaction mixture can then be acidified with dilute mineral acids, which dissolve the reaction product, thereby separating it from minor amounts of the corresponding anthranilic acid which is generally formed. Such separation can be effected by filtration. Then the filtrate can be alkalized and the substituted anthranilamide extracted with suitable solvents, such as ether, benzene, chloroform, and the like. The organic solution can be washed with water and dried, and the solvent can be removed to give the desired product.

The substituted anthranilamides of the general Formula I are liquids which are volatile under reduced pressures, or solids which can be crystallized. From them the above-cited salts can be prepared using obvious processes.

Due to their analgesic, anti-inflammation and anti-ulcer properties, the substituted anthranilamides of the general Formula I are remarkable therapeutic products. For illustrative purposes, we shall set forth hereinbelow the properties of N-(2-butylamino-benzoyl)-N-(γ-dimethyl-aminopropyl)amine maleate (general Formula I wherein R=H, R'=n-butyl, R''=$CH_3$, n=3):

(a) *Analgesic action.*—The inflammatory pain test (Siegmund et al., Proc. Soc. Exp. Biol., N.Y. 95, 729–731, 1957; Randall and Selitoo, Arch. Int. Pharmacodyn. 111, 409–419, 1957) showed analgesic action at doses of from 10 to 20 mg./kg. s.c. Said doses are many times lower than those necessary to obtain similar effects using acetylsalicyclic acid, and are very close to those which are active for codeine. The non-inflammatory pain test (Woolfe and MacDonald, J. Pharmacol. Exp. Ther. 80, 300–307, 1944), on the contrary, showed that the product in question is slightly active, as is also the case with other anti-inflammatory analgesics of the acetylsalicyclic acid type.

(b) *Anti-inflammation action.*—The foot edema produced in rats by injecting various irritating agents (carrageenin, beer yeast, serotonin, and the like), and the granuloma caused by strange bodies (Meier et al., Ex-perientia 6, 469–471, 1950), were studied in particular. Both of these tests showed high action at doses in the range from 5 to 10 mg./kg. s.c., doses which are about half of those necessary to obtain the same effect using phenylbutazone.

(c) *Anti-gastric ulcer action.*—The product, in doses of from 10 to 20 mg./kg. s.c., completely inhibits the ulcer produced by immobilization and reserpine in rats.

The preparation process according to the invention is further illustrated by the following examples which however are not limitative in any way.

EXAMPLE 1

N-(2-butylaminobenzoyl)-N-(γ-dimethylaminopropyl) amine (a) To a solution of 200 g. of phosgene in 1200 ml. of toluene kept at room temperature, 150 g. of dry N-butylanthranilic acid were added in portions. The acid dissolved immediately. The resulting solution was allowed to stand for two hours and then the solvent was removed under reduced pressure. The residue was diluted with 200 ml. of petroleum ether to give an 89% yield of N-butyl-isatoic anhydride. The reaction product, added in portions. After the addition was completed, the reaction mixture was heated for 15 minutes to complete the reaction, cooled, diluted with dilute sulphuric acid and then filtered to remove the few insolubles. The acid solution was alkalized and extracted with ether, and the ether solution was washed and dried. Then the solvent was removed to give an oil consisting of N-(2-butylaminobenzoyl) - N - (γ - dimethylaminopropyl)amine. B.P. 180° C./0.2 mm. Hg. Yield 70%. Maleate M.P. 85° C.

*Analysis.*—Calcd. for $C_{16}H_{27}N_3O \cdot C_4H_4O_4$: C, 61.05; H, 7.94; N, 10.68%. Found: C, 60.84; H, 7.84; N, 10.65%. Hydrochloride M.P. 113° C. Phosphate M.P. 148° C.

EXAMPLE 2

(a) Following the method disclosed in Example 1(a), N-butyl-4-chloro-isatoic anhydride (M.P. 112° C., from benzene) was obtained from 2-n-butylamino-4-chlorobenzoic acid and phosgene.

*Analysis.*—Calcd. for $C_{12}H_{12}ClNO_3$: C, 56.81; H, 4.77; N, 5.52%. Found: C, 56.73; H, 5.04; N, 5.52%.

(b) Following the method disclosed in Example 1(b), from N-butyl-4-chloro-isatoic anhydride and 3-dimethylamino-1-propylamine, in an aqueous medium, a high yield of N-(2-butylamino-4-chlorobenzoyl)-N - (γ - dimethylaminopropyl)amine (M.P. 47° C., from hexane) was obtained.

*Analysis.*—Calcd. for $C_{16}H_{26}ClN_3O$: C, 61.62; H, 8.41; Cl, 11.36%. Found: C, 61.82; H, 8.70; Cl, 11.36%. Hydrochloride M.P. 143° C.

EXAMPLE 3

N-(2-benzylaminobenzoyl)-N-(β-dimethylaminoethyl) amine

To a solution of 10 g. of dimethylaminoethylamine in 50 ml. of water, which had been heated to 80° C., 20 g. of powdered N-benzyl-isatoic anhydride (prepared according to W. L. F. Armarego, J. Chem. Soc. 1961, p. 2700) were added in portions. After the addition was completed, the reaction mixture was heated for another half hour, cooled, diluted with 200 ml. of water, and acidified with dilute sulphuric acid to give about 2 g. of N-benzylanthranilic acid. The acid solution was then alkalized and extracted with ether. The ether solution was washed and dried and the solvent was removed to give a solid residue which was recrystallized from hexane. Yield 14 g.; M.P. 75° C. Maleate M.P. 136° C. (from ethanol).

*Analysis.*—Calcd. for $C_{18}H_{23}N_3O \cdot C_4H_4O_4$: C, 63.90; H, 6.58; N, 10.16%. Found C, 63.85; H, 6.44; N, 10.26%.

Following the same procedure, starting from 3-dimethylaminopropylamine, N-(2-benzylaminobenzoyl)-N-(γ-dimethylaminopropyl)amine (M.P. 65° C., from hexane) was obtained. Maleate M.P. 160° C.

*Analysis.*—Calcd. for $C_{19}H_{25}N_3O \cdot C_4H_4O_4$: C, 64.62; H, 6.84; N, 9.88%. Found: C, 64.54; H, 6.59; N, 9.83%.

Following the same procedure, from 2-diethylaminoethylamine and the same N-benzylisatoic anhydride, N-(2-benzylaminobenzoyl)-N-(β-diethylaminoethyl) amine was obtained. Maleate M.P. 93° C. (from anhydrous ethanol).

*Analysis.*—Calcd. for $C_{20}H_{27}N_3O \cdot C_4H_4O_4$: C, 65.28; H, 7.08%. Found: C, 65.18; H, 6.88%.

EXAMPLE 4

N-(5-chloro-2-methylaminobenzoyl)-N-(γ-dimethylaminopropyl)amine (a) To a solution of 13 g. of 5-chloro-isatoic anhydride in 120 ml. of dimethylformamide, 7. g. of anhydrous sodium carbonate and 18 g. of methyl iodide were added. The reaction mixture was stirred for 20 hours at room temperature and then poured into 700 ml. of water to give 10 g. of crude N-methyl-5-chloro-isatoic anhydride. Yield 72%. The crude anhydride was purified from benzene and melted at 201° C. (dec.).

*Analysis.*—Calcd. for $C_9H_6ClNO_3$: C, 51.08; H, 2.86; N, 16.76%. Found: C, 51.26; H, 3.09; N, 16.79%.

(b) To a solution of 27 g. of 3-dimethylaminopropylamine in 100 ml. of water, which had been heated to 110° C., 50 g. of N-methyl-5-chloro-isatoic anhydride were added in portions within 15 minutes. After the addition was completed, the reaction mixture was heated for another 15 minutes, cooled, diluted with 300 ml. of water and acidified with a 10% solution of sulphuric acid to obtain a precipitate of N-methyl-5-chloroanthranilic acid, which was filtered. The acid solution was washed with ether and alkalized with NaOH. The base thus obtained was extracted with ether and the ether solution was washed and dried. The solvent was removed to give 38 g. of solid N-(5-chloro - 2 - methylaminobenzoyl)-N-(γ-dimethyleneaminopropyl)amine. After crystallization from hexane, the product melted at 92° C.

*Analysis.*—Calcd. for $C_{13}H_{20}ClN_3O$: C, 57.88; H, 7.47; N, 15.58%. Found: C, 58.00; H, 7.60; N, 15.36%. Hydrochloride M.P. 198° C.

EXAMPLE 5

(a) An alcoholic solution of 0.1 mole of anthranilic acid was treated with 0.1 mole of p-methoxybenzaldehyde. The reaction mixture was heated for a short time, cooled and diluted with water to give a precipitate consisting of the p-methoxybenzylidene-derivative of anthranilic acid. After drying, the precipitate was dissolved in ethylene glycol diethyl ether, and the solution thus obtained was treated with a slight excess of sodium borohydride. Upon neutralization with acetic acid and dilution with water, a crystalline precipitate of 2-p. methoxybenzylamino-benzoic acid was obtained. M.P. 163° C. (from benzene.)

*Analysis.*—Calcd. for $C_{15}H_{15}NO_3$: C, 70.02; H, 5.88%. Found: C, 70.10; H, 6.05%.

(b) The above acid was converted by treatment with ethyl chloroformate and acetyl chloride into the corresponding N-p-methoxybenzylisatoic anhydride (M.P. 143° C., from anhydrous ethanol). The crude product was added to an aqueous solution of 3-dimethylaminopropylamine heated to 100° F. Following the method used in the preceding examples, a high yield of N-(2-p-methoxybenzylaminobenzoyl)-N-(γ - dimethylaminopropyl) amine (M.P. 83° C., from hexane) was obtained. Maleate M.P. 127° C. (from anhydrous ethanol).

*Analysis.*—Calcd. for $C_{20}H_{27}N_3O_2 \cdot C_4H_4O_4$: C, 63.00; H, 6.83; N, 9.19%. Found: C, 62.88; H, 6.63; N, 9.35%.

EXAMPLE 6

(a) Following the procedure of Example 5(a), starting from anthranilic acid and p-chlorobenzaldehyde, a benzylidene-derivative was obtained, which was directly reduced with sodium borohydride to 2-p-chloro-benzylaminobenzoic acid. M.P. 146° C. (from alcohol).

*Analysis.*—Calcd. for $C_{14}H_{12}ClNO_2$: C, 64.25; H, 4.62; N, 5.35%. Found: C, 64.37; H, 4.79; N, 5.37%.

(b) Following the usual procedure, the above-mentioned acid was converted into N-p-chlorobenzylisatoic anhydride (M.P. 163° C.), which was directly reacted in a boiling aqueous solution with 3-dimethylaminopropylamine. In such manner N-(2-p-chlorobenzylaminobenzoyl) -N-(γ-dimethylaminopropyl)amine was obtained (M.P. 86° C., from hexane). Maleate M.P. 117° C. (from ethanol).

*Analysis.*—Calcd. for $C_{19}H_{24}ClN_3O \cdot C_4H_4O_4$: C, 59.80; H, 6.11; N, 9.10%. Found: C, 59.87; H, 6.23; N, 9.15%.

EXAMPLE 7

(a) To a suspension of 21 g. of potassium salt of 2-bromo-5-methoxy-benzoic acid in 250 ml. of amyl alcohol, 4 g. of copper, 20 g. of anhydrous potassium carbonate and 22 g. of butylamine were added. The reaction mixture was heated for eight hours at 110° C. while stirring. Then the alcohol was steamed distilled.

What we claim is:

1. A substituted anthranilamide having the formula I

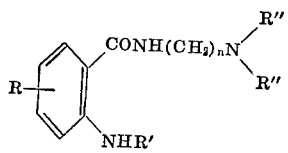

wherein R is hydrogen or chlorine; R' is selected from the group consisting of a lower alkyl group having from 1 to 4 carbon atoms, $C_6H_5CH_2$, $p.ClC_6H_4CH_2$, and $$p.CH_3—OC_6H_4CH_2$$

R'' is $CH_3$ or $C_2H_5$; and $n$ is 2 or 3.

2. An anthranilamide of claim 1 comprising N-(2-butylaminobenzoyl)-N-(γ-dimethylaminopropyl)amine.
3. An anthranilamide of claim 1 comprising N-(2-benzylaminobenzoyl)-N-(β-dimethylaminoethyl)amine.
4. An anthranilamide of claim 1 comprising N-(5-chloro-2-methylaminobenzoyl) - N - (γ - dimethylaminopropyl)amine.
5. An anthranilamide of claim 1 comprising N - (2-benzylaminobenzoyl)-N-(γ-dimethylaminopropyl)amine.
6. An anthranilamide of claim 1 comprising N - (2-benzylaminobenzoyl)-N-(β-diethylaminoethyl)amine.
7. An anthranilamide of claim 1 comprising N - (2-butylamino - 4 - chlorobenzoyl - N - (γ - dimethylaminopropyl)amine.
8. An anthranilamide of claim 1 comprising N - (2-p - methoxybenzylaminobenzoyl) - N - (γ - dimethylaminopropyl)amine.
9. An anthranilamide of claim 1 comprising N - (2-p - chlorobenzylaminobenzoyl) - N - (γ - dimethylaminopropyl)amine.
10. A physiologically tolerable salt of an anthranilamide of claim 1.
11. A physiologically tolerable salt of the anthranilamide of claim 2.
12. A hydrochloride of the anthranilamide of claim 2.
13. A physiologically tolerable salt of the anthranilamide of claim 3.
14. A physiologically tolerable salt of the anthranilamide of claim 4.
15. A physiologically tolerable salt of the anthranilamide of claim 5.
16. A physiologically tolerable salt of the anthranilamide of claim 6.
17. A physiologically tolerable salt of the anthranilamide of claim 7.
18. A physiologically tolerable salt of the anthranilamide of claim 8.
19. A physiologically tolerable salt of the anthranilamide of claim 9.

References Cited

UNITED STATES PATENTS

| | | | |
|---|---|---|---|
| 2,671,805 | 3/1954 | Krimmel | 260—558 |
| 2,691,025 | 10/1954 | Clinton et al. | 260—558 |
| 3,217,001 | 11/1965 | Santilli et al. | 260—558 |

FOREIGN PATENTS 1,159,180  2/1958  France.

OTHER REFERENCES

Bing et al., Acta Pharmacol. Toxicol., vol. 4, p. 199–204 (1948).

HENRY R. JILES, *Primary Examiner.*

WALTER A. MODANCE, *Examiner.*

H. I. MOATZ, *Assistant Examiner.*

UNITED STATES PATENT OFFICE
CERTIFICATE OF CORRECTION

Patent No. 3,409,668

November 5, 1968

Giuseppe Palazzo et al.

It is certified that error appears in the above identified patent and that said Letters Patent are hereby corrected as shown below:

Column 3, line 6, after "product," insert -- after crystallization from hexane, melted at 74° C.
Analysis.—Found: C, 65.64; H, 5.82; N, 6.30%. Calc. for $C_{12}H_{13}NO_3$: 65.74; 5.98; 6.39%.
(b) 7.7 g. of 3-dimethylamino-1-propylamine were dissolved in 30 ml. of water and heated to 100° C. To said solution 15 g. of N-butylisatoic anhydride were --; line 14, "benzol" should read -- benzoyl --; line 59, "160" should read -- 106 --. Column 4, line 4, "crue" should read -- crude --; line 22, "methyleneaminopropyl" should read -- methylaminopropyl --; line 49, "100° F." should read -- 100° C. --. Column 5, line 1, beginning with "EXAMPLE 7" cancel all to and including "distilled," in line 7; same column 5, line 36, "-chlorobenzoyl" should read -- -chlorobenzoyl) --.

Signed and sealed this 24th day of February 1970.

(SEAL)
Attest:

EDWARD M. FLETCHER, JR.
Attesting Officer

WILLIAM E. SCHUYLER, JR.
Commissioner of Patents